Jan. 15, 1952　　　A. J. NERAD　　　2,582,268
METHOD OF WELDING
Filed Nov. 30, 1948
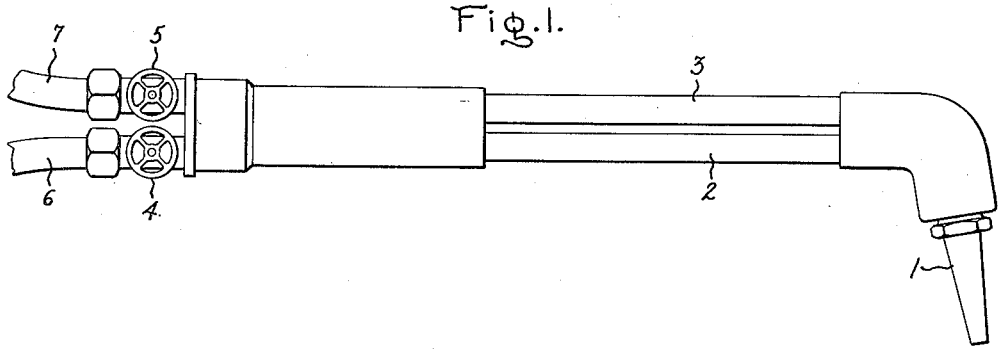
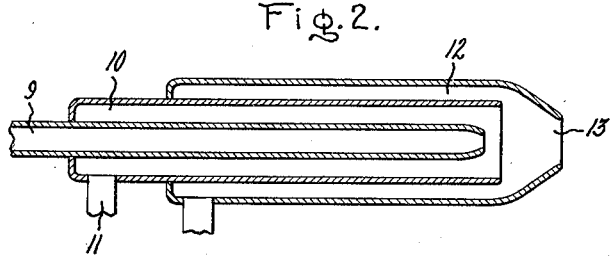
Inventor:
Anthony J. Nerad,
by （signature）
His Attorney.

Patented Jan. 15, 1952

2,582,268

UNITED STATES PATENT OFFICE 2,582,268

METHOD OF WELDING

Anthony J. Nerad, Alplaus, N. Y., assignor to General Electric Company, a corporation of New York Application November 30, 1948, Serial No. 62,663

3 Claims. (Cl. 113—112)

The present invention relates to the art of welding and cutting metals. It is particularly concerned with a method of welding a metal employing a welding gas, the combustion of which provides a high temperature flame and the combustion products of which form a flux or coating for protecting the molten portion of the weld area.

At the present time, the two most common methods of welding and cutting metal involve the combustion of hydrogen or acetylene. The temperature of the hydrogen flame is relatively low, and unless a substantial excess of hydrogen is used considerable oxidation of the molten metal results. While the oxy-acetylene flame has a somewhat higher temperature, it is not as high as may be desired for all applications, and the use of the flame has the disadvantage of depositing carbon in the weld area with a consequent weakening or embrittlement of the weld. In general, the temperature of the oxy-acetylene flame is in the neighborhood of 3000-3500° C.

An object of the present invention is to provide a method of welding whereby welding temperatures considerably above the temperature of the oxy-acetylene flame can be realized.

Another object of the invention is to provide a method of welding whereby the products of combustion of the welding gas will form a protective flux overlying the weld area.

A specific object of the invention is to provide a method of welding by means of the combustion of a weld gas containing a substantial proportion of a boron hydride.

Further objects of the invention will become apparent from the following description and from the accompanying drawing in which Fig. 1 illustrates somewhat schematically a side view of the welding torch and Fig. 2 illustrates diagrammatically a preferred torch tip arrangement for burning a mixture of boron hydride and a second fuel.

In Fig. 1 there is shown a torch including a torch tip 1 connected to a pipe 2 for supplying welding gas to the tip and a pipe 3 for supplying to the tip a combustion supporter such as air or oxygen. Needle valves 4 and 5 are provided for respectively controlling the flow of the gases through pipes 2 and 3. Flexible tubes 6 and 7 serve to connect the pipes 2 and 3 to sources of supply for the welding gas and combustion supporter.

The welding gas employed in the practice of the present invention comprises a boron hydride, including mixtures of two or more hydrides, or mixtures of any of the usual vapor or vaporizable welding fuels and a substantial proportion of a gaseous or vaporizable boron hydride or of boron hydride mixtures.

While any gaseous or vaporizable boron hydride may be employed, the lower boron hydrides (boranes) such as diborane, $B_2H_6$, tetraborane, $B_4H_{10}$, and pentaborane, $B_5H_9$, or mixtures including these boranes are preferred. For maximum temperatures, the welding gas should consist entirely of the boranes and oxygen should be employed as the combustion supporting gas. By means of oxy-boron hydride mixtures in the preferred stoichiometric proportions of about three parts by volume of oxygen to one part by volume boron hydride, flame temperatures substantially exceeding the maximum oxy-acetylene flame temperature can readily be obtained.

For lower welding temperatures or for economic purposes, mixtures of boron hydride or boron hydrides with any of the well-known fuels such as hydrogen, illuminating gas, etc., can be employed. In general, the boron hydride should comprise a substantial proportion of the mixed fuel and should at least be sufficient to form the desired flux layer on the metal melted during the welding operation. For the latter purpose, the boron hydride preferably should comprise at least about 5 per cent by volume of such mixed gaseous fuels.

The heat energy per unit weight of the products of combustion of the boron hydrides approaches one and one-half times that of acetylene so that by means of oxy-boron hydride flames, materials heretofore impossible or difficult to weld satisfactorily can readily be fused by means of the present invention. Again, because of the high temperatures attainable by use of the boron hydrides, it may be desired to dilute the hydrides by mixing with other fuels whereby welding temperatures lower than those obtained by combustion with oxygen of the pure boron hydrides but still substantially higher than the oxy-acetylene temperatures can be employed to advantage. Special chemical effects within the weld area may also be realized by the combustion of mixtures of the boron hydrides with fuels contributing other elements, the presence of which is desired in the weld area. For example, boron and carbon may be supplied in controlled proportions by the combustion of suitable mixtures of the hydrides and a hydrocarbon fuel such as acetylene, propane, or the like. Special precautions may be necessary to lower these properly as, for example, diborane and acetylene react with one another and should be mixed at the point of combustion.

Illustrative of the present invention is the burning of a mixture of diborane and oxygen in a weld torch to give an extremely brilliant flame hotter than any obtainable in the same torch by combustion of mixtures of oxygen and hydrogen or acetylene. Pieces of copper, iron, steel and Nichrome were readily melted and welded by the oxy-boron hydride flame. Due to the protective skin or film of boric oxide which formed over the molten metal, no oxidation of the molten metal occurred. The fusion together of two pieces of Nichrome produces a weld which was unoxidized and malleable.

When employing a second fuel in addition to the boron hydride, the second fuel advantageously may be premixed with the combustion supporter and the boron hydride then added to the resultant mixture. A particularly useful torch structure for this purpose is schematically illustrated in Fig. 2 of the drawing. In this torch the oxygen or other oxygenous combustion supporter introduced through the inner tube 9 and the welding gas, such as hydrogen introduced into the coaxial passage 10 through inlet 11, are partially mixed adjacent the outlet end of tube 9 before the combustion supporting gas contacts the boron hydride flowing through the outer passage 12. The final mixture passes through tip outlet 13 ready for combustion adjacent thereto. The use of a torch of this general structure has the advantage of preventing the deposition of boric oxide on or adjacent the burner tip.

Tests have shown that, using the same torch, the flame from a diborane-air mixture has about the same temperature as a hydrogen-oxygen flame.

Due to the high flame velocity of the boron hydrides strike back of the flame through conventional torch orifices followed by combustion inside the torch may be encountered, particularly at low gas velocities. To overcome this problem, the boron hydride can be premixed with a second fuel such as hydrogen and this mixture premixed with oxygen before combustion. Employing this technique, with conventional torches, stable flames can be obtained with hydrogen-boron hydride mixtures containing up to about 12 per cent of the boron compound. The combustion of hydrogen-boron hydride mixtures containing about 12 per cent boron hydride gave an extremely brilliant flame hot enough to melt the edges of a piece of thoria ($ThO_2$ M. P. 3050° C.).

While oxygen and air have been given as examples of suitable combustion supporters for the boron hydrides, the invention is not limited thereto. Experiments have shown that diborane, for example, can be burned readily using nitrous oxide or chlorine as the combustion supporting gas in place of oxygen. More elevated temperatures may be obtained by burning the boron hydride with fluorine as the combustion supporter.

In general, the boron compound or compounds and the combustion supporter should be fed to the welding torch in approximately stoichiometrical proportions or in proportions such that there is a slight excess of the boron hydride fuel. When mixtures of boron hydride and hydrogen, acetylene or other fuel are employed, the ratios of fuel and air or oxygen should, of course, be regulated to obtain optimum combustion of the mixtures.

What I claim as new and desire to secure by Letters Patent of the United States is:

1. The method of welding a metal and simultaneously providing a protective flux layer over the weld area which comprises applying a burning mixture of diborane and an oxygenous atmosphere to the portion of the metal to be welded.

2. The method of welding metal which comprises heating the metal to welding temperatures by the combustion in an oxygenous atmosphere of a welding gas including hydrogen and about 12 per cent diborane, said diborane being sufficient to provide a protective boron-containing flux on the weld area.

3. The method of welding metal and simultaneously providing the molten portion of the welding area with a protective layer of a boron-containing flux which comprises bringing the metal to welding temperatures by the combustion in an oxygenous atmosphere of a welding gas containing hydrogen and substantial quantity of a diborane.

ANTHONY J. NERAD.

REFERENCES CITED

The following references are of record in the file of this patent:

UNITED STATES PATENTS

| Number | Name | Date |
|---|---|---|
| 1,748,785 | Miller | Feb. 25, 1930 |
| 2,043,212 | Krauss | June 2, 1936 |
| 2,277,064 | Bialosky | Mar. 24, 1942 |
| 2,421,649 | Priest | June 3, 1947 |

OTHER REFERENCES

The Weld. Encyl. 12 Ed. 1947, p. 305—by Weld. Eng. Pub. Co., N. Y. Copy in Div. 14.

Mellor, Inorganic and Theoretical Chem., vol. 5, p. 34. Pub. 1924, by Longman's Green and Co., London, Eng. Copy in Div. 59.